US010133860B2

(12) United States Patent
Das et al.

(10) Patent No.: US 10,133,860 B2
(45) Date of Patent: Nov. 20, 2018

(54) COMPUTER IMPLEMENTED SYSTEMS AND METHODS FOR GENERATING AND RECOVERING AN AUTHORIZATION CODE

(71) Applicant: Tata Consultancy Services Ltd., Mumbai, Maharashtra (IN)

(72) Inventors: Shatadru Das, North Paraganas (IN); Natarajan Vijayarangan, Chennai (IN)

(73) Assignee: TATA CONSULTANCY SERVICES LTD., Mumbai (IN)

( * ) Notice: Subject to any disclaimer, the term of this patent is extended or adjusted under 35 U.S.C. 154(b) by 101 days.

(21) Appl. No.: 14/851,959

(22) Filed: Sep. 11, 2015

(65) Prior Publication Data
US 2016/0078217 A1   Mar. 17, 2016

(30) Foreign Application Priority Data
Sep. 11, 2014  (IN) .......................... 2899/MUM/2014

(51) Int. Cl.
  *G06F 21/00* (2013.01)
  *G06F 21/45* (2013.01)
  *G06F 21/36* (2013.01)
(52) U.S. Cl.
  CPC .............. *G06F 21/45* (2013.01); *G06F 21/36* (2013.01)
(58) Field of Classification Search
  CPC .............. G06F 21/36; G06F 21/45; H04L 9/32
  USPC .......................................................... 726/18
  See application file for complete search history.

(56) References Cited

U.S. PATENT DOCUMENTS

| 5,428,349 A * | 6/1995 | Baker .................. G06Q 20/382 235/382.5 |
| 7,434,061 B2 | 10/2008 | Moseley |
| 8,191,126 B2 | 5/2012 | Raghavan |
| 2004/0230843 A1 | 11/2004 | Jansen |
| 2005/0289352 A1 | 12/2005 | Benjes |
| 2007/0022354 A1* | 1/2007 | Yu ...................... H03M 13/1114 714/755 |
| 2007/0245149 A1 | 10/2007 | Lin |
| 2011/0156867 A1 | 6/2011 | Carrizo et al. |

(Continued)

FOREIGN PATENT DOCUMENTS
EP      2101242      9/2009

*Primary Examiner* — Syed A Zaidi
(74) *Attorney, Agent, or Firm* — Blueshift IP, LLC; Robert Plotkin

(57) ABSTRACT

A computer implemented system and method for generating and recovering an authorization code. The system creates an authorization code by accepting a base-sentence from a user. Based on the characters present in this base-sentence, the system computes a base-sentence matrix. The system also generates a plurality of patterns. The user can either select the pattern from the multiple patterns suggested by the system or can create his/her own pattern. The system then performs multiplications between the base-sentence matrix and the selected pattern matrix at different stages in the path forward, for obtaining a strong authorization code. In case the user forgets the base sentence, the system also has provisions to manage forgotten authorization code. This is done by fragmenting the base-sentence into different matrices and storing the fragmented matrices into a repository after computing matrix multiplication with a security question answer and with a secret key provided by the user.

17 Claims, 7 Drawing Sheets

(56) References Cited

U.S. PATENT DOCUMENTS

2013/0318351 A1* 11/2013 Hirano ............... H04L 9/3073
                                                                  713/168

* cited by examiner

COMPUTER IMPLEMENTED SYSTEMS AND METHODS FOR GENERATING AND RECOVERING AN AUTHORIZATION CODE

FIELD OF THE DISCLOSURE

The present disclosure relates to the field of computer implemented systems and methods for generating and recovering authorization code.

DEFINITIONS OF TERMS USED IN THE SPECIFICATION

The expression 'computing device' used hereinafter in the specification refers to but is not limited to a desktop, a mobile phone, a laptop, a tablet, an iPad, a PDA, a notebook, a net books, a terminal including a wired and/or a wireless computing device.

The expression 'authorization code' used hereinafter in the specification refers to bust is not limited to a secret key, a password, a passkey, a key, a passcode, a secret code, a passphrase, a watchword, a personal identification number (PIN) and a code-word.

These definitions are in addition to those expressed in the art.

BACKGROUND

In the computing industry, securing information is of utmost importance. Today, there are many available techniques to secure information. One of the known ways of securing information is to protect the information by locking the information either by providing an authorization code or by encrypting the information. This enables an authorized user or a limited number of users to access the locked information. This methodology of protecting information by locking with the authorization code prevents attempts made by other users from accessing the information.

The authorization code plays a very significant role in securing the personal information from being accessed by others. In the current scenario, the user's information pertaining to messages, emails, working environment, photos, bank account information, credit card information, social security information, permanent account information and the like are protected by the authorization code due to our dependency on the digital world created by the internet. Therefore, it is quite important to create a strong authorization code and remember it as the computing industry has become quite vulnerable to the other set of users known as computer crackers and hackers. If a cracker gains access of the authorization code of a particular user, user's information no longer remains confidential and the user's privacy is compromised, which may further results in bringing misfortune or defaming or blackmailing the user. This made the user to create strong authorization code which cannot be cracked easily by any computer software, crackers or hackers. However, such authorization code becomes very difficult to remember as the combination of the characters cannot to be correlated with any subject which will help the user to remember. However, tough the user memorizes the authorization code but may be forgotten over time, which may result in panic at the hour of need and delay.

Accordingly, there is a long felt need for a computerized system that will aim at enabling the user to create a strong authorization code for protecting the user's information.

Further, there is a need for a solution that enables the user to remember the created authorization code easily.

OBJECTS

Some of the objects of the present disclosure aimed to ameliorate one or more problems of the prior art or to at least provide a useful alternative are described herein below:

An object of the present disclosure is to provide a computer implemented system for a computer implemented system and method for generating an authorization code.

Another object of the present disclosure is to provide a computer implemented system for a computer implemented system and method for recovering the authorization code.

Another object of the present disclosure is to provide a system that receives a base-sentence as a user input for the purpose of generating and recovering the authorization code.

Another object of the present disclosure is to provide a system that is capable of generating authorization code which adheres to the policies related to creation of authorization codes.

Another object of the present disclosure is to provide a system that generates an authorization code which is easy to remember for the user.

Another object of the present disclosure is to provide a system that allows creation of multiple authorization codes for multiple user accounts.

Another object of the present disclosure is to provide a system that generates highly secure authorization code while maintaining the privacy of the user.

Another object of the present disclosure is to provide a system that allows easy recovery of the forgotten authorization code.

Other objects and advantages of the present disclosure will be more apparent from the following description when read in conjunction with the accompanying figures, which are not intended to limit the scope of the present disclosure.

SUMMARY

In one aspect, the present disclosure envisages a computer implemented system and method for generating an authorization code. The system receives a base-sentence as a user input. Based on the characters present in the base-sentence, the system computes a base-sentence matrix, wherein each cell of the base-sentence matrix is populated with a character corresponding to the base-sentence. In accordance with the base-sentence matrix computed by the system, the system is capable of generating a plurality of patterns, from which the user can select a pattern as desired. The system is configured to perform matrix multiplications at different stages in the path forward for obtaining a strong authorization code.

In another aspect, the present disclosure envisages a computer implemented system and method for recovering a user input base-sentence. The system additionally manages forgot authorization code. This is done by fragmenting the base-sentence into different matrices and storing the fragmented matrices into the repository after computing matrix multiplication with a security question answer and with a secret key provided by the user.

BRIEF DESCRIPTION OF THE ACCOMPANYING DRAWINGS

The computer implemented systems and methods for generating and recovering an authorization code of the present disclosure will now be explained in relation to the non-limiting accompanying drawings, in which.

DETAILED DESCRIPTION

Figure 1:
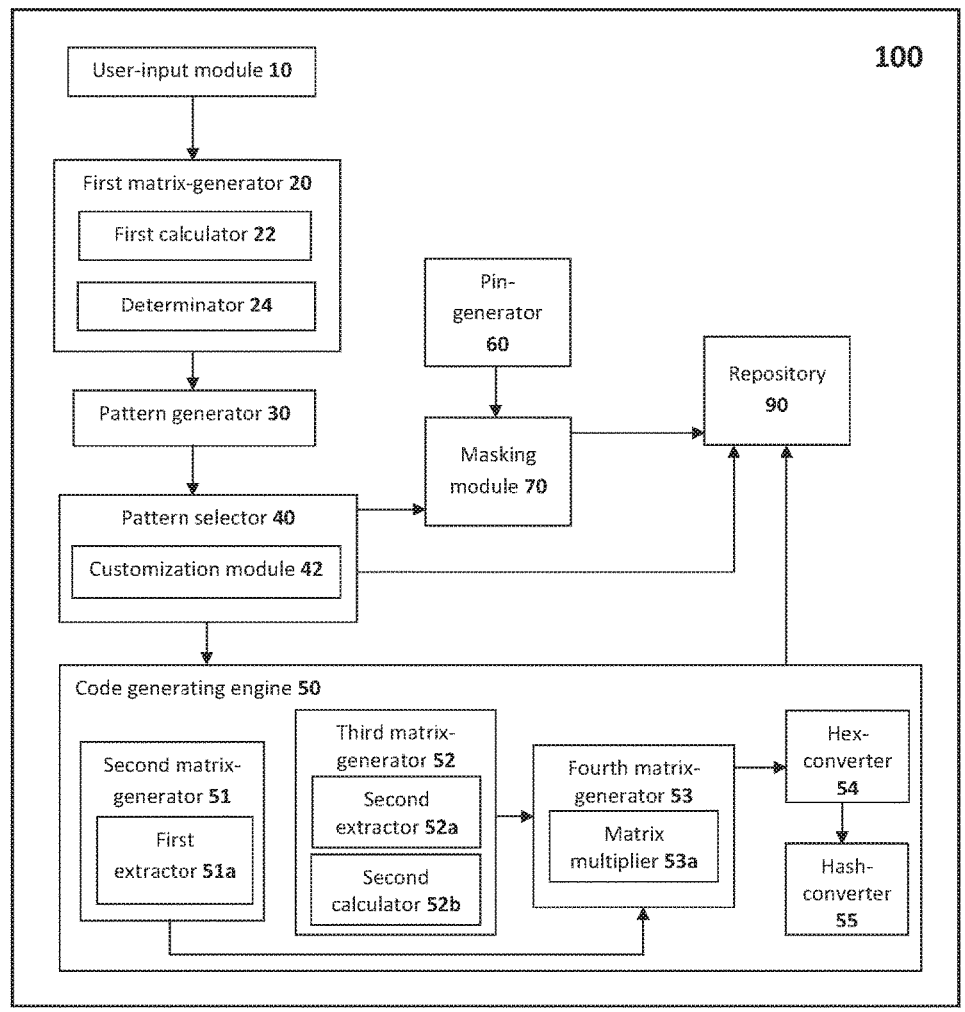
FIG. 1 illustrates a system-level block diagram of the components of a computer implemented system for authorization code generation, in accordance with the present disclosure.

The computer implemented systems and methods for generating and recovering an authorization code will now be described with reference to the accompanying drawings, which do not restrict the scope and ambit of the present disclosure. The description is provided purely by the way of illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description hereinafter, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

In recent times, it has been observed that creating an authorization code for the purpose of protecting information such as bank accounts, emails, working environments, messages and the like, by following the authorization policies to create a strong authorization code is quite easy. The requirement of creating strong authorization codes is realized because of the growing attacks from crackers or hackers, due to which user's information and privacy are compromised.

However, the problem arises when the user is required to remember such authorization codes. Over a period of time, the user creates multiple authorization codes for protecting information at multiple sources. Therefore, memorizing multiple authorization codes becomes a difficult task for the user and due to which the authorization codes may be forgotten or the exact sequence of characters in the authorization code may be forgotten at the hour of need. In the existing solutions, it has also been observed that if the authorization code is forgotten, for the purpose of retrieving the authorization code, the existing solutions may request the user to select or provide answers to the selected security questions or other alternative contact accounts during the user registration process. At a later time, when the user actually requests for forgotten authorization code, either a link is sent to the user's alternative account to reset the authorization code or the solutions asks for answers corresponding to the user selected security questions. Based on the positive validation of the answers provided by the user the solution enables the user to reset the existing authorization code. Further, if the aforementioned strategy for retrieving the forgotten authorization code fails or does not work out for the user, eventually the user lands up in calling the help desk and panic.

To obviate the aforementioned problems of the existing solutions, the present disclosure envisages a computer implemented systems and methods for authorization code generation. The system enables the users to not only create a strong authorization code for protecting information but also provides a mechanism so that the user is able to remember the created authorization code easily. Users are required to register themselves with the system to access the functionalities offered by the system by filling the registration form. In the registration form there is a provision for creating the authorization code based on user's choice and also enabling the user to satisfy all the policies for creating the authorization code generation.

In accordance with the present disclosure, an exemplary embodiment described herein below is a process for creating a strong authorization code and also satisfying all the authorization polices. The steps include:

receiving a user input base-sentence: "this is my bank password";

extracting an authorization code from the base-sentence: <u>this</u> is <u>my</u> <u>bank</u> pass<u>word</u>, wherein "thismbakword" is extracted from the base-sentence;

introducing special characters into the extracted code: $thismbak*word;

introducing numeric characters: $thismbak*word<u>97</u>;

introducing uppercase and lowercase characters: $thismb <u>AK</u>*word97; and final authorization code retrieved: <u>$thismbAK*word97</u>.

Though the authorization code created based on the aforementioned strategy is strong, it is very difficult for the user to remember the authorization code all the time.

Referring to FIG. 1, there is shown a system-level block diagram of the components of a computer implemented system 100 for generating an authorization code. The system 100 is a set of computer instructions stored in a memory and executed by a processor of a computing device. The set of computer instructions corresponding to the system 100 can be stored into a server and can be accessed via a communication network. The system 100 includes but is not limited to a user-input module 10, a first matrix-generator 20, a pattern-generator 30, a pattern-selector 40, a code generating engine 50, a pin-generator 60, a masking module 70 and a repository 90. The user is required to provide a base-sentence to the system 100, this base-sentence is received by the user-input module 10. The base-sentence can include a plurality of alphanumeric and special characters. The alphanumeric characters includes a, b, c, d, e, f, g, h, i, j, k, l, m, n, o, p, q, r, s, t, u, v, w, x, y, z, A, B, C, D, E, F, G, H, I, J, K, L, M, N, O, P, Q, R, S, T, U, V, W, X, Y, Z, 0, 1, 2, 3, 4, 5, 6, 7, 8, and 9. The special characters includes ~, !, @, #, $, %, ^, &, *, (,), _, +, =, -, ', , ., /, \, :, ', [, ], {, }, |, :, ", ?, >, and <. The user-input module 10 is interfaced with the hardware port connected to a keypad via which the user inputted base-sentence is received by the user-input module 10.

In accordance with the present disclosure, the first matrix-generator 20 cooperates with the user-input module 10 to receive the user inputted base-sentence. The matrix-generator 20 includes a first calculator referenced by the reference numeral 22 and a determinator referenced by the reference numeral 24. The first calculator 22 receives the user inputted base-sentence and calculates the total number characters in the base-sentence. Based on number characters calculated, the first calculator 22 determines the nearest prefect. In addition, the determinator 24 determines whether all the characters of the base-sentence fit within the nearest perfect square matrix determined. If all the characters of the base-sentence do not fit into the nearest perfect square matrix, the number of columns in the determined nearest perfect square matrix is increased by one. This is done by the first matrix-generator 20. Once the number of rows and columns of a first matrix is decided, the first matrix-generator 20 populates the first matrix with each of the characters of the base-sentence. Each cell of the first matrix is filled with a single character from the base-sentence. In an embodiment, the characters of the base-sentence are filled into the cells of the first matrix sequentially.

The pattern-generator 30 of the system 100 cooperates with the first matrix-generator 20 and receives the first matrix filled with the characters from the user-inputted base-sentence. The pattern-generator 30 is enabled to generate a plurality of patterns by selecting at least a cell of the first-matrix created by the first matrix-generator 20. The pattern-generator 30 cooperates with the pattern-selector 40. The pattern-selector 40 receives all the patterns generated by the pattern-generator 30 and enables the user to select a pattern from the available patterns as desired. The pattern-selector 40 includes a customization module referenced by the reference numeral 42. The customization module 42 enables the user to customize the characters of the selected pattern. The user is enabled to customize the characters present in the selected pattern either in upper case format or in lower case format or can have a combination of both upper case format and lower case format.

In accordance with the present disclosure, once the selected pattern is customized and receives a confirmation instruction from the user, the pattern-selector 40 cooperates with the code generating engine 50 and communicates the selected pattern for the purpose of generating an authorization code based on the base-sentence initially provided by the user. The code generating engine 50 includes but is not limited a second matrix-generator 51, a third matrix-generator 52, a fourth matrix-generator 53, hex-convertor 54 and hash-convertor 55. The second matrix-generator 51 includes a first extractor denoted by the reference numeral 51a. The second matrix-generator 51 receives the selected pattern and determines the characters filled in the cells of the selected pattern. Based on the characters determined in the selected pattern, the first extractor 51a extracts the ASCII values corresponding to the determined characters. Once the ASCII values of the characters are extracted by the first extractor 51a, the second matrix-generator 51 generates a second matrix. Each cell of the second matrix is populated with the ASCII value of a character corresponding to the selected pattern received.

The third matrix-generator 52 receives the selected pattern and determines the characters filled in the cells of the selected pattern. The third matrix-generator 52 includes a second extractor referenced by the reference numeral 52a and a second calculator referenced by the reference numeral 52b. The second extractor 52a is enabled to extract at least a coordinate of each of the characters of the selected pattern. The second calculator 52b cooperates with the second extractor 52a to receive the list of coordinates corresponding to the characters of the selected pattern. The second calculator 52b is enabled to calculate the total number of characters in the extracted coordinates. Typically, the coordinates are extracted in numerical characters. Based on the extracted coordinates of the selected pattern and the total number of numerical characters calculated the third matrix-generator 52 determines number of rows and columns for creating a third matrix. The third matrix corresponds to the nearest prefect square matrix based on the total number of coordinate characters calculated by the second calculator 52b. Once the rows and columns of the third matrix are decided, the third matrix-generator 52 generates the third matrix by populating each cell of the third matrix with a coordinate value extracted by the second extractor 52a.

In accordance with the present disclosure, the fourth matrix-generator 53 cooperates with the second matrix-generator 51 and the third matrix-generator 52. The fourth matrix-generator 53 receives the second matrix from the second matrix-generator 51 and the third matrix from the third matrix-generator 52. The fourth matrix-generator 53 includes a matrix-multiplier referenced by the reference numeral 53a. The matrix-multiplier 53a is enabled to perform matrix multiplication of the second matrix with the third matrix. Based on the result of the matrix multiplication performed by the matrix-multiplier 53a, the fourth matrix-generator 53 decides the rows and columns for creating a fourth matrix to accommodate the results of the matrix multiplication. Once the rows and columns for the fourth matrix are decided, the fourth matrix-generator 53 generates the fourth matrix by populating each cell of the fourth matrix with at least a value obtained from matrix multiplication. Once the creation of the fourth matrix is complete, the fourth matrix-generator 53 cooperates with the hex-convertor 54. After receiving the fourth matrix, the hex-convertor 54 converts each of the cell value of the fourth matrix into a hex value. The hex-convertor 54 generates a hex-matrix from the fourth matrix. The hash-convertor 55 cooperates with the hex-convertor 54 and receives the hex-matrix. The hash-convertor 55 is enabled to hash each cell value of the hex-matrix to obtain the authorization code for the corresponding user. Typically, the hash-convertor 55 hashes the hex values of the hex-matrix using SHA-256 to obtain the authorization code.

In accordance with an embodiment of the present disclosure, the pin-generator 60 of the system 100 generates at least a four digit Personal Identification Number (PIN). The pin-generator 60 also enables the user to customize the PIN generated. The pin-generator 60 cooperates with the masking module 70 to transmit the generated PIN. The masking module 70 cooperates with the pattern-selector module 40 to receive the selected pattern. The masking module 70 is enabled to mask the selected pattern with the PIN generated by the pin-generator 60. The masked selected pattern is further stored into the repository 90.

In accordance with the present disclosure, the repository 90 stores the user related information such as user credentials provided at the time of registration, the user submitted base-sentence, a selected pattern corresponding to a user customized pattern and a masked pattern, a PIN, an authorization code, a user selected secret question and an answer to the user selected secret question.

Figure 2:
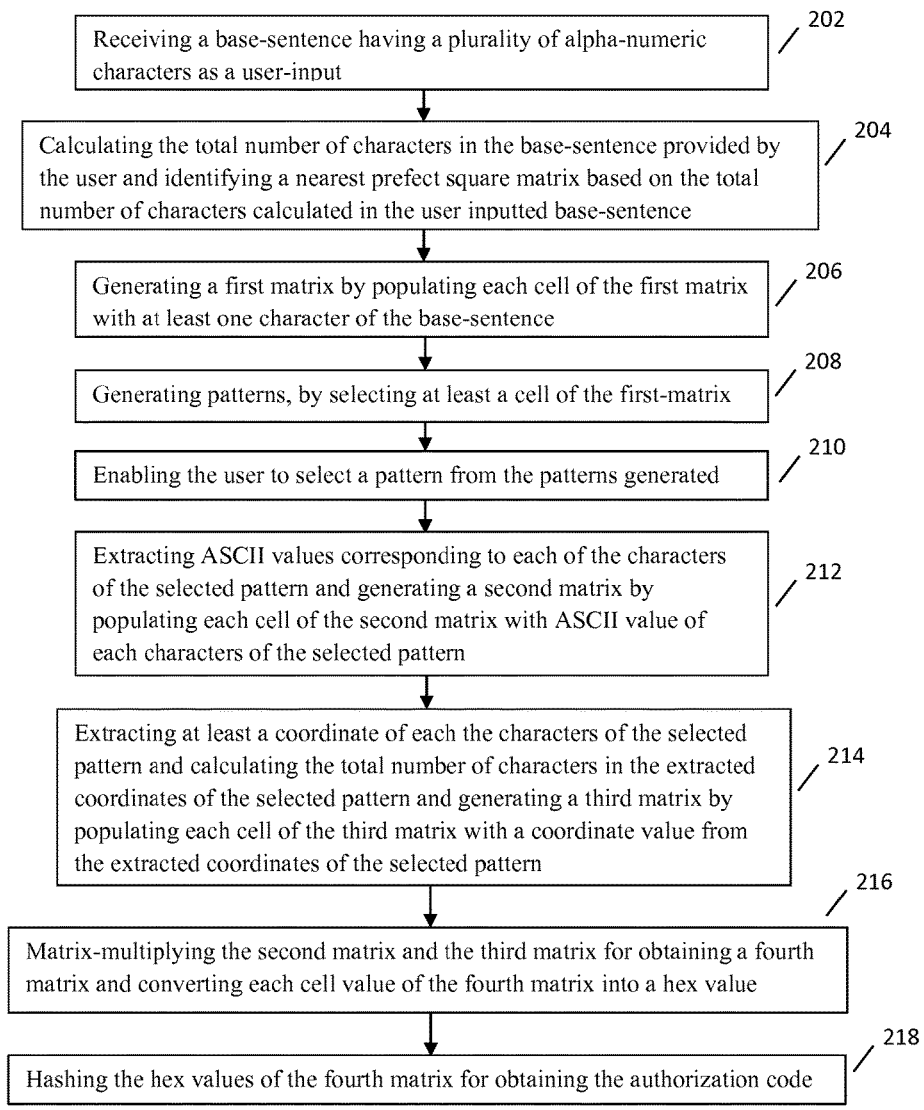
FIG. 2 illustrates a method for implementing the system 100 for authorization code generation as illustrated in FIG. 1, in accordance with the present disclosure.

Referring to FIG. 2, a method for implementing a computer implemented system 100 for generating an authorization code, as illustrated in FIG. 1, in accordance with the present disclosure. The method envisaged by the present disclosure includes the following steps:

- receiving a base-sentence having a plurality of alpha-numeric characters as a user-input 202;
- calculating the total number of characters in the base-sentence provided by the user and identifying a nearest prefect square matrix based on the total number of characters calculated in the user inputted base-sentence 204;
- generating a first matrix by populating each cell of the first matrix with at least one character of the base-sentence 206;
- generating patterns, by selecting at least a cell of the first-matrix 208;
- enabling the user to select a pattern from the patterns generated 210;
- extracting ASCII values corresponding to each of the characters of the selected pattern and generating a second matrix by populating each cell of the second matrix with ASCII value of each characters of the selected pattern 212;
- extracting at least a coordinate of each the characters of the selected pattern and calculating the total number of characters in the extracted coordinates of the selected pattern and generating a third matrix by populating each cell of the third matrix with a coordinate value from the extracted coordinates of the selected pattern 214;
- matrix-multiplying the second matrix and the third matrix for obtaining a fourth matrix and converting each cell value of the fourth matrix into a hex value 216; and
- hashing the hex values of the fourth matrix for obtaining the authorization code 218.

In accordance with the present disclosure, the method includes the steps of generating a Personal Identification Number (PIN) corresponding to the user and further masking the selected pattern with the PIN.

In accordance with the present disclosure, the step of identifying a nearest prefect square matrix based on the total number of characters calculated in the user inputted base-sentence subsequently, includes the step of determining whether all the characters of the base-sentence can be populated within the nearest perfect square matrix, wherein based on a negative result, increasing the number of columns of the nearest perfect square matrix by one for creating the first matrix.

In accordance with the present disclosure, the step of calculating the total number of characters in the extracted coordinates of the selected pattern further includes the step of determining a nearest prefect square matrix based on the calculated total number of extracted prefect square matrix.

In accordance with the present disclosure, wherein the step of enabling the user to select a pattern further includes the step of customizing the characters of the selected pattern, wherein the customization format of the characters is selected from the group consisting of an upper case format, a lower case format and a combination thereof.

In accordance with the present disclosure, the method includes the step of storing, in a repository, at least a user related information such as user credentials, a user submitted base-sentence, a selected pattern corresponding to a user customized pattern and a masked pattern, a PIN, an authorization code, a user selected secret question and an answer to the user selected secret question.

Figure 3:
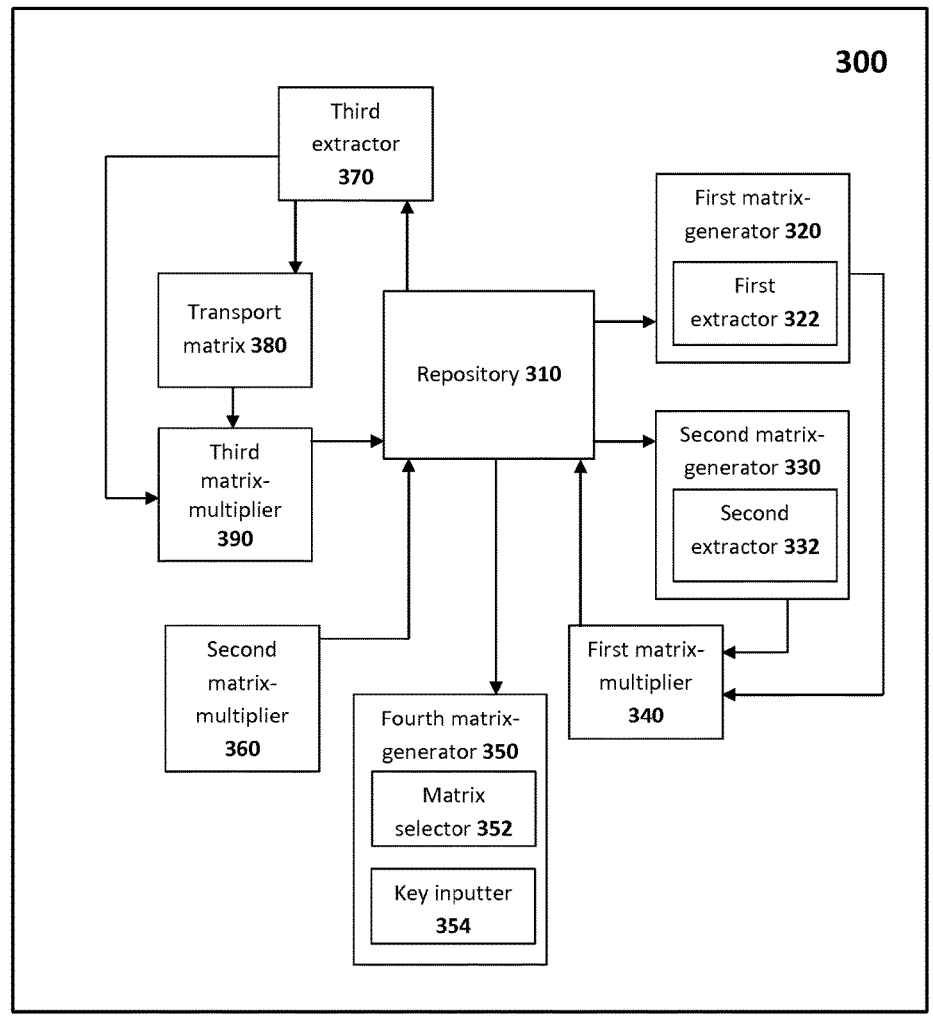
FIG. 3 illustrates a system-level block diagram of a computer implemented system for recovering a user input base-sentence, in accordance with the present disclosure.

Referring to FIG. 3, there is shown a system-level block diagram of components of a computer implemented system 300 for recovering a user input base-sentence, in accordance with the present disclosure. The system 300 includes but is not limited to a repository 310, a first matrix-generator 320, a second matrix-generator 330, a first matrix-multiplier 340, a fourth matrix-generator 350, a second matrix-multiplier 360, a third extractor 370, a transpose module 380 and a third matrix-multiplier 390. The system 300 for recovering the authorization code from the repository is based on the request submitted by the user. In accordance with the present disclosure, the system 300 is covered in two embodiments:

a) a first embodiment relates to computation of a set of instructions stored in a memory by a processor for storing the user input base-sentence into the repository 310; and b) a second embodiment relates to computation of a set of instructions stored in the memory by the processor for recovering the user input base-sentence stored from the repository 310, wherein the memory and the processor are configured within the hardware arrangement of the computing device accessed by the user.

The repository 310 stores at least a user related information such as user credentials provided at the time of registration, a user submitted base-sentence having a plurality of alpha numeric characters, a selected pattern corresponding to a user customized pattern and a masked pattern, a Personal Identification Number (PIN), an authorization code, a user selected secret question and an answer to the user selected secret question.

In accordance with the first embodiment of the system 300, the first matrix-generator 320 cooperates with the repository 310. The first matrix-generator 320 includes a first extractor denoted by the reference numeral 322. The first extractor 322 extracts the characters of the user input base-sentence from the repository 310. The first extractor 322 also extracts the ASCII values of the corresponding characters of the base-sentence. The first matrix-generator 320 determines the number of matrices to be created based on the number of characters present in the base-sentence. The first matrix-generator 320 generates a first set of matrices to accommodate all the characters of the base-sentence in the first set of matrices. Each cell of a matrix corresponding to the first set of matrices is populated with the ASCII value of a character corresponding base-sentence. Each matrix in the first set of matrices relates to a (3×3) matrix or in other words having three rows and three columns.

The second matrix-generator 330 cooperates with the repository 310. The second matrix-generator 330 includes a second extractor denoted by the reference numeral 332. The second extractor 332 extracts the characters of the user input answer of the user selected question. The second extractor 332 also extracts the ASCII values of the corresponding characters of the answer. The second matrix-generator 330 determines the number of matrices to be created based on the number of characters present in the answer. The second matrix-generator 330 generates a second set of matrices to accommodate all the characters of the answer in the second set of matrices. Each cell of a matrix corresponding to the second set of matrices is populated with the ASCII value of a character corresponding answer. Each matrix in the second set of matrices relates to a (3×3) matrix or in other words having three rows and three columns.

Once the first set of matrices and the second set of matrices are created, the first matrix-multiplier 340 cooperates with the first matrix-generator 320 and the second matrix-generator 330. The first matrix-multiplier 340 performs matrix multiplication, where each matrix corresponding to the first set matrices is multiplied with each matrix corresponding to the second set of matrices. The first matrix-multiplier 340 further generates a third set of matrices based on the matrix multiplication and further stores the third set of matrices into the repository 310.

The fourth matrix-generator 350 cooperates with the first matrix-generator 320 and second matrix-generator 330. The fourth matrix-generator 350 includes a matrix-selector denoted by reference numeral 352 and a key-inputter denoted by reference numeral 354. The matrix-selector 352, typically, selects a first matrix corresponding to the first set of matrices and a first matrix from the second set of matrices. The key-inputter 354 enables the user to provide a key. This key can be an IP (internet protocol) address of a computing device accessed by the user or a MAC (media access control) address of the computing device accessed by the user or an email ID of the registered user and/or an IMEI (international mobile station equipment identity) number of the user's computing device. The key provided by the user is a security key. The fourth matrix-generator 350 performs matrix multiplication of the matrix selected from the first set of matrices, the matrix selected from the second set of matrices and the key received from the user. Based on the matrix multiplication performed, the fourth matrix-generator 350 generates a key-matrix.

The second matrix-multiplier 360 cooperates with the repository 310. The second matrix-multiplier 360 cooperates with the first matrix-multiplier 340 to receive the third set of matrices. The second matrix-multiplier 360 cooperates with the fourth matrix-generator 350 to receive the key-matrix. The second matrix-multiplier 360 performs matrix multiplication by multiplying each matrix corresponding to the third set of matrices with the key-matrix. Based on the matrix multiplication performed, the second matrix-multiplier 360 generates a fourth set of matrices and further stores the fourth set of matrices into the repository 310. In one embodiment, if the security key provided by the user corresponds to the MAC/IP address of the user's computing device, then the fourth set of matrices also get stored into the memory of the computing device. In another embodiment, if the security key provided by the user corresponds to the user's registered email ID, then the fourth set of matrices also get stored into the email of the user. In another embodiment, if the security key provided by the user corresponds to the IMEI number of the user's computing device, then the fourth set of matrices also get stored into the user's computing device.

In accordance with the second embodiment of the system 300, the third extractor 370 cooperates with the repository 310 and extracts the fourth set of matrices, the second set of matrices and the key-matrix. The transpose module 380 cooperates with the third extractor 370 to receive the extracted the fourth set of matrices, the second set of matrices and the key-matrix. The transpose module 380 performs matrix transpose function on the second set of matrices and the key-matrix. This action generates a transposed second set of matrices and a transposed key-matrix. The third matrix-multiplier 390 cooperates with the repository 310, the third extractor 370 and the transpose module 380. The third matrix-multiplier 390 receives the extracted fourth set of matrices, the transposed second set of matrices and the transposed key-matrix. The third matrix-multiplier 390 performs a first matrix multiplication where each matrix corresponding to the fourth set of matrices are multiplied with the transposed key-matrix. Based on the matrices obtained as a result of the first matrix multiplication, the third matrix-multiplier 390 performs a second matrix multiplication where each resultant matrices of the first matrix multiplication are multiplied with the transposed second set of matrices to recover the base-sentence. Typically, the resultant matrices obtained on completion of the first matrix multiplication corresponds to the third set of matrices. If the resultant matrices obtained on completion of the first matrix multiplication do not correspond to the third set of matrices earlier generated and stored by the first matrix-multiplier 340, an error message is displayed on the user interface of the computing device accessed by the user. Typically, the resultant matrices obtained on completion of the second matrix multiplication corresponds to the first set of matrices, wherein the first set of matrices represents the ASCII values of the characters of the base-sentence stored into said repository. Based on successful completion of the second matrix multiplication, the confirmation message is displayed on the user interface of the computing device accessed by the user. If the resultant matrices obtained on completion of the second matrix multiplication do not correspond to the first set of matrices earlier generated and stored by the first matrix-generator 320, an error message is displayed on the user interface of the computing device accessed by the user.

Figure 4A:
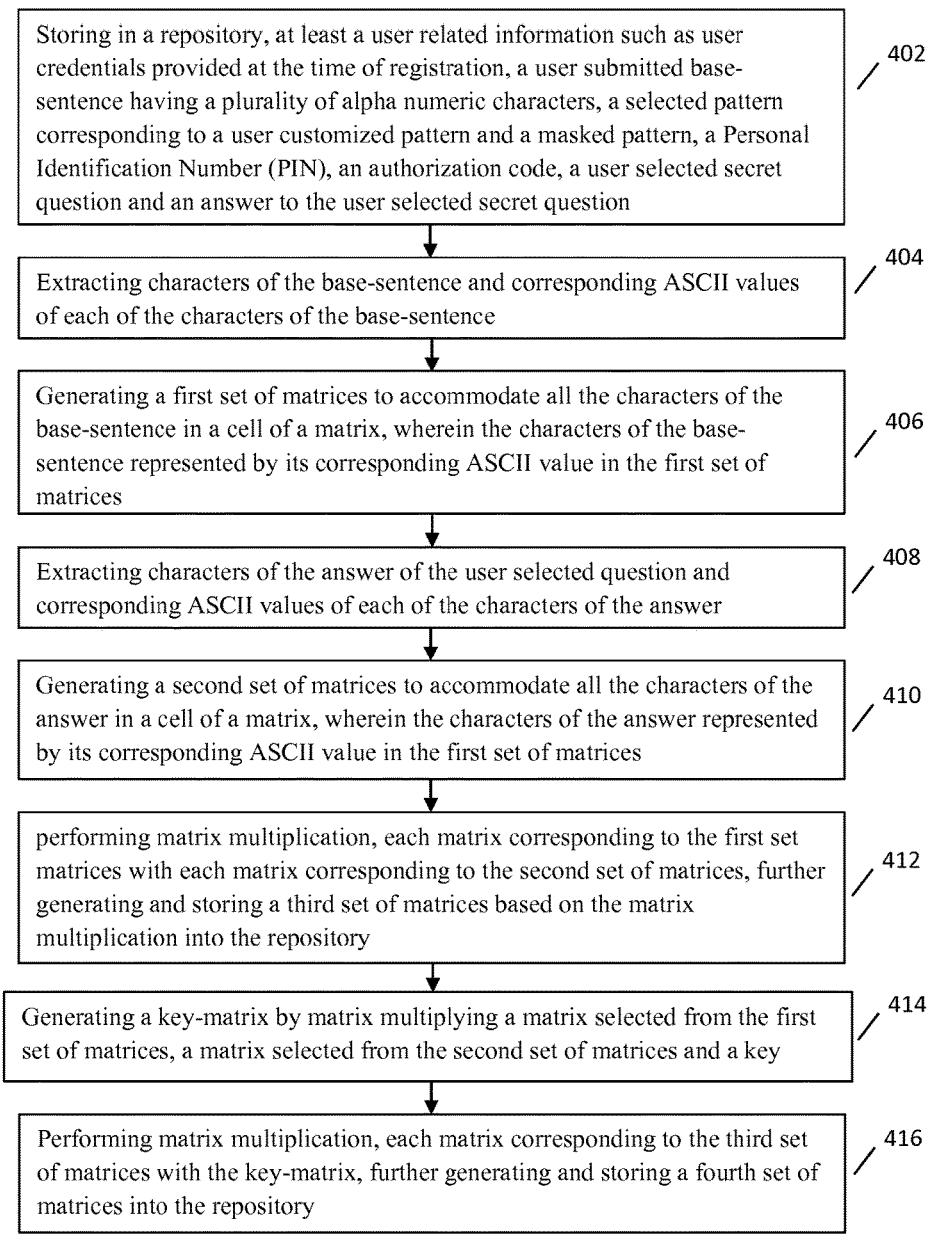
FIGS. 4a and 4b illustrate a method for implementing the system 300 recovering the user input base-sentence as illustrated in FIG. 3, in accordance with the present disclosure.
Figure 4B:
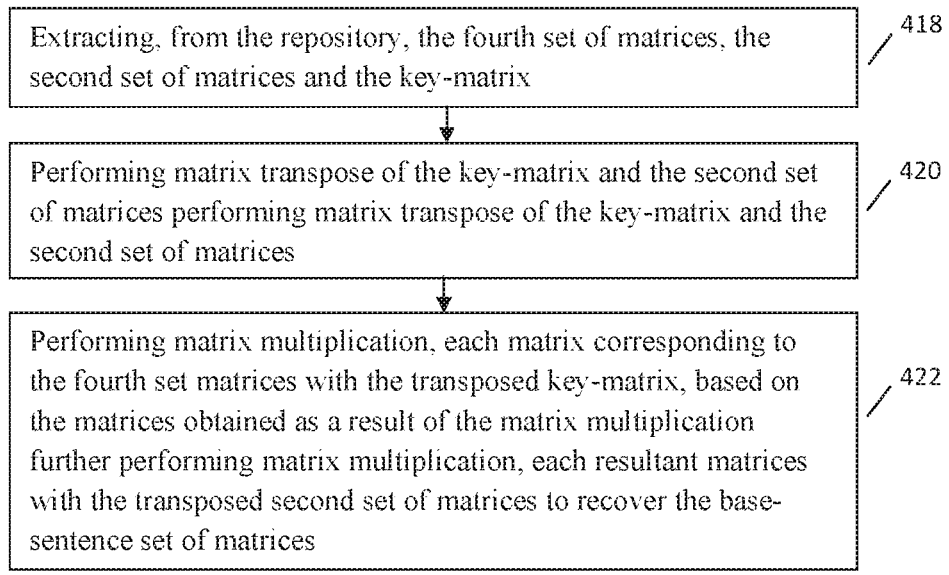

Referring to FIGS. 4a and 4b, a method for implementing a computer implemented system 300 for recovering the user input base-sentence, as illustrated in FIG. 3, in accordance with the present disclosure. The method envisaged by the present disclosure includes the following steps:

in one embodiment, computing a set of instructions stored in a memory by a processor for storing a user input base-sentence into a repository:

storing in a repository, at least a user related information such as user credentials provided at the time of registration, a user submitted base-sentence having a plurality of alpha numeric characters, a selected pattern corresponding to a user customized pattern and a masked pattern, a Personal Identification Number (PIN), an authorization code, a user selected secret question and an answer to the user selected secret question 402;

extracting characters of the base-sentence and corresponding ASCII values of each of the characters of the base-sentence 404;

generating a first set of matrices to accommodate all the characters of the base-sentence in a cell of a matrix, wherein the characters of the base-sentence represented by its corresponding ASCII value in the first set of matrices 406;

extracting characters of the answer of the user selected question and corresponding ASCII values of each of the characters of the answer 408;

generating a second set of matrices to accommodate all the characters of the answer in a cell of a matrix, wherein the characters of the answer represented by its corresponding ASCII value in the first set of matrices 410;

performing matrix multiplication, each matrix corresponding to the first set matrices with each matrix corresponding to the second set of matrices, further generating and storing a third set of matrices based on the matrix multiplication into said repository 412;

generating a key-matrix by matrix multiplying a matrix selected from the first set of matrices, a matrix selected from the second set of matrices and a key 414; and performing matrix multiplication, each matrix corresponding to the third set of matrices with the key-matrix, further generating and storing a fourth set of matrices into said repository 416;

in another embodiment computing a set of instructions stored in said memory by said processor for recovering the user input base-sentence stored into said repository:

extracting, from said repository, the fourth set of matrices, the second set of matrices and the key-matrix 418;

performing matrix transpose of the key-matrix and the second set of matrices 420; and performing matrix multiplication, each matrix corresponding to the fourth set matrices with the transposed key-matrix, based on the matrices obtained as a result of the matrix multiplication further performing matrix multiplication, each resultant matrices with the transposed second set of matrices to recover the base-sentence 422.

EXAMPLE 1

In accordance with the present disclosure, an exemplary embodiment is described herein below illustrating the steps for generation of a strong authorization code.

Step 1:
receiving a base-sentence as a user input—"this is my bank password";
calculating total number of characters in the base-sentence i.e. 20, wherein these 20 characters of the base-sentence can be expressed in a (5×4) matrix;

Step 2:
determining the nearest perfect square matrix i.e. a (4×4) matrix, since the total number of characters in the base-sentence is 20, therefore, increasing the column number by one;
generating a (4×5) matrix and populating the (4×5) matrix with the characters of the base sentence, as illustrated in Table-I;

TABLE I

| x/y | 1 | 2 | 3 | 4 | 5 |
|---|---|---|---|---|---|
| 1 | t | h | i | s | i |
| 2 | s | m | y | b | a |
| 3 | n | k | p | a | s |
| 4 | s | w | o | r | d |

Step 3:
generating multiple patterns as illustrated in Table-II, Table-III, Table-IV, Table-V and the like;

TABLE II

| x/y | 1 | 2 | 3 | 4 | 5 |
|---|---|---|---|---|---|
| 1 |  |  |  | s | i |
| 2 |  | m | y | b | a |
| 3 |  | k |  | p | a | s |
| 4 |  |  | w | o | r | d |

TABLE III

| x/y | 1 | 2 | 3 | 4 | 5 |
|---|---|---|---|---|---|
| 1 |   |   |   |   |   |
| 2 | s | m |   | b | a |
| 3 | n | k |   | a | s |
| 4 | s | w |   | r | d |

TABLE IV

| x/y | 1 | 2 | 3 | 4 | 5 |
|---|---|---|---|---|---|
| 1 |   | h | i |   | i |
| 2 | s |   |   | b | a |
| 3 | n |   |   | a | s |
| 4 |   | w | o |   | d |

TABLE V

| x/y | 1 | 2 | 3 | 4 | 5 |
|---|---|---|---|---|---|
| 1 | t |   |   |   | i |
| 2 | s | m |   | b | a |
| 3 | n | k |   | a | s |
| 4 | s |   |   |   | d |

Step 4:
selecting a pattern from patterns generated in the Step 3, if the user selects the pattern illustrated in Table-II, i.e. the symbol of "F";

TABLE II

| x/y | 1 | 2 | 3 | 4 | 5 |
|---|---|---|---|---|---|
| 1 | t | h | i |   |   |
| 2 | s |   |   |   |   |
| 3 | n | k |   |   |   |
| 4 | s |   |   |   |   | extracting the characters present in the selected pattern i.e. "thisnks";

Step 5:
customizing the characters of the selected pattern, the user is enabled to customize the characters of the selected pattern either in a upper case format or a lower case format or a combination of both, as illustrated below in Table-II;

TABLE II

| x/y | 1 | 2 | 3 | 4 | 5 |
|---|---|---|---|---|---|
| 1 | T | H | I |   |   |
| 2 | s |   |   |   |   |
| 3 | n | k |   |   |   |
| 4 | s |   |   |   |   | extracting the modified characters, i.e. "THIsnks";

Step 6:
extracting corresponding ASCII values of the customized selected pattern, as illustrated in Table-VI

TABLE VI

| T | H | I | s | n | k | s |
|---|---|---|---|---|---|---|
| 84 | 72 | 73 | 115 | 110 | 107 | 115 |

Step 7:

generating a matrix of the extracted ASCII values and adding zero (0) as padding if the selected characters are less to satisfy the matrix multiplication rule, as illustrated in Table-VII;

TABLE VII

Matric-C

| 84 | 72 | 73 | 115 |
|---|---|---|---|
| 110 | 107 | 115 | 0 |

Step 8:

extracting the associated coordinates and characters of the selected pattern, i.e. (X/Y) (1,1) (1,2) (1,3) (2,1) (3,1) (3,2) (4,1), as illustrated in Table-II of Step 5;

generating a coordinate matrix, as illustrated in Table-VIII;

TABLE VIII

Matrix-O

| 1 | 1 | 1 | 2 |
|---|---|---|---|
| 1 | 3 | 2 | 1 |
| 3 | 1 | 3 | 2 |
| 4 | 1 | 0 | 0 |

Step 9:

performing matrix multiplication, (Matrix-C X Matrix-O), and generating a new Matrix-X, as illustrated in Table-IX;

TABLE VII

Matric-C X

| 84 | 72 | 73 | 115 |
|---|---|---|---|
| 110 | 107 | 115 | 0 |

TABLE VIII

Matrix-O

| 1 | 1 | 1 | 2 |
|---|---|---|---|
| 1 | 3 | 2 | 1 |
| 3 | 1 | 3 | 2 |
| 4 | 1 | 0 | 0 |

TABLE IX

Matric-X

| 835 | 488 | 447 | 386 |
|---|---|---|---|
| 217 | 431 | 324 | 327 |

Step 10:

converting the values of the Matrix-X in hex values, as illustrated in Table-X;

TABLE X

Matric-X

| 343 | 1e8 | 1bf | 182 |
|---|---|---|---|
| d9 | 1af | 144 | 147 |

Step 11:

performing hash function using SHA-256 on the values (343 1e8 1bf 182 d9 1af 144 147) of the Matrix-X as illustrated in Table-X, obtaining the strong authorization code, i.e. 52fc413d703347754833af9f301c34c2e22caea5d9fbacc0d602b508427f676.

To remember this password the user is required to remember the pattern selected in the Step 4.

EXAMPLE 2

In accordance with the present disclosure, another exemplary embodiment is described herein below illustrating the steps for managing forgot authorization code and base-sentence recovery.

Figure 5:
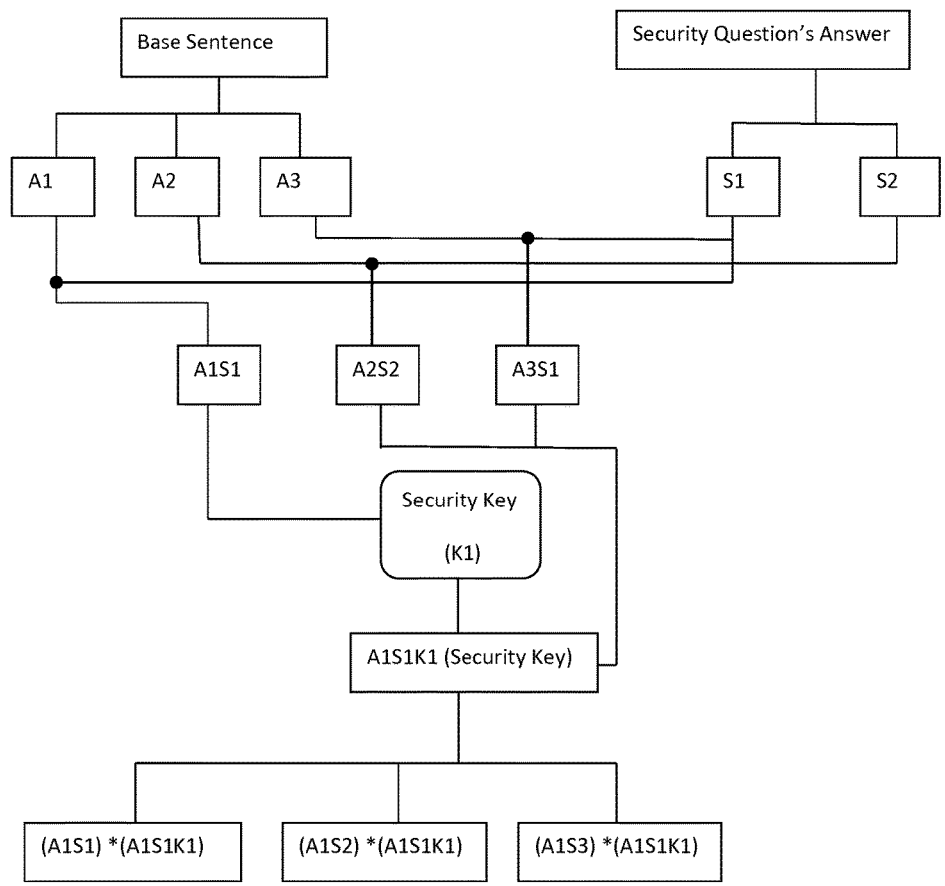
FIG. 5 shows a flow-diagram illustrating an exemplary embodiment for managing forgot authorization code, in accordance with the present disclosure.

Referring to FIG. 5, the exemplary embodiment includes the following steps for managing forgot authorization code:

receiving user input base-sentence: t h i s i s m y b a n k p a s s w o r d;

generating ASCII values of the characters of the base-sentence 116 104 105 115 105 115 109 121 98 97 110 107 112 97 115 115 119 111 114 100;

creating a plurality of the (3×3) matrices to accommodate all the characters of the base-sentence, wherein the ASCII values are populated in the matrices (A1, A2 and A3), as illustrated below Table-XI;

TABLE XI

A1 =

| 116 | 104 | 105 |
|---|---|---|
| 115 | 105 | 115 |
| 109 | 121 | 98 |

A2 =

| 97 | 110 | 107 |
|---|---|---|
| 112 | 97 | 115 |
| 115 | 119 | 111 |

A3 =

| 114 | 100 | 0 |
|---|---|---|
| 0 | 0 | 0 |
| 0 | 0 | 0 | receiving answer to a selected security question, for example, security question: "What is your first school?"

answer to the security question: e c o s p a c e h i g h s c h o o l;

generating ASCII values of the characters of the security question 101 99 111 115 112 97 99 101 104 105 103 104 115 99 104 111 111 108;

creating a plurality of the (3×3) matrices to accommodate all the characters of the security answer, wherein the ASCII values are populated in the matrices (S1 and S2), as illustrated below Table-XII;

TABLE XII

S1 =

| 101 | 99 | 111 |
|---|---|---|
| 115 | 112 | 97 |
| 99 | 101 | 104 |

TABLE XII-continued $$S2 = \begin{array}{|c|c|c|} \hline 105 & 103 & 104 \\ \hline 115 & 99 & 104 \\ \hline 111 & 111 & 108 \\ \hline \end{array}$$

alternatively, multiplying the base-sentence matrices (A1, A2 and A3) with the security answer matrices (S1 and S2) and obtaining matrices A1S1, A2S2, A3S1, wherein matrices obtained after matrix multiplication are stored into the repository; matrix multiplication results: A1S1, A2S2, A3S1;

receiving a secret key (K1) from the user, for example, the user can provide a MAC/IP address of a computing device, an email ID associated with the user, and a IMEI number of the user computing device as the secret key;

computing a security matrix by performing matrix-multiplication of a base-sentence matrix (A1), a security answer matrix (S1) and secret key (K1); security matrix (A1×S1×K1): A1S1K1;

computing matrices multiplication of the matrices (A1S1, A2S2, A3S1) with the security matrix (A1S1K1), obtaining a set of resultant matrices; and resultant matrices: {(A1S1)*(A1S1K1)}, {(A1S2)*(A1S1K1)}, {(A1S3)*(A1S1K1)};

storing the resultant matrices [{(A1S1)*(A1S1K1)}, {(A1S2)*(A1S1K1)}, {(A1S3)*(A1S1K1)}] into the repository.

Figure 6:
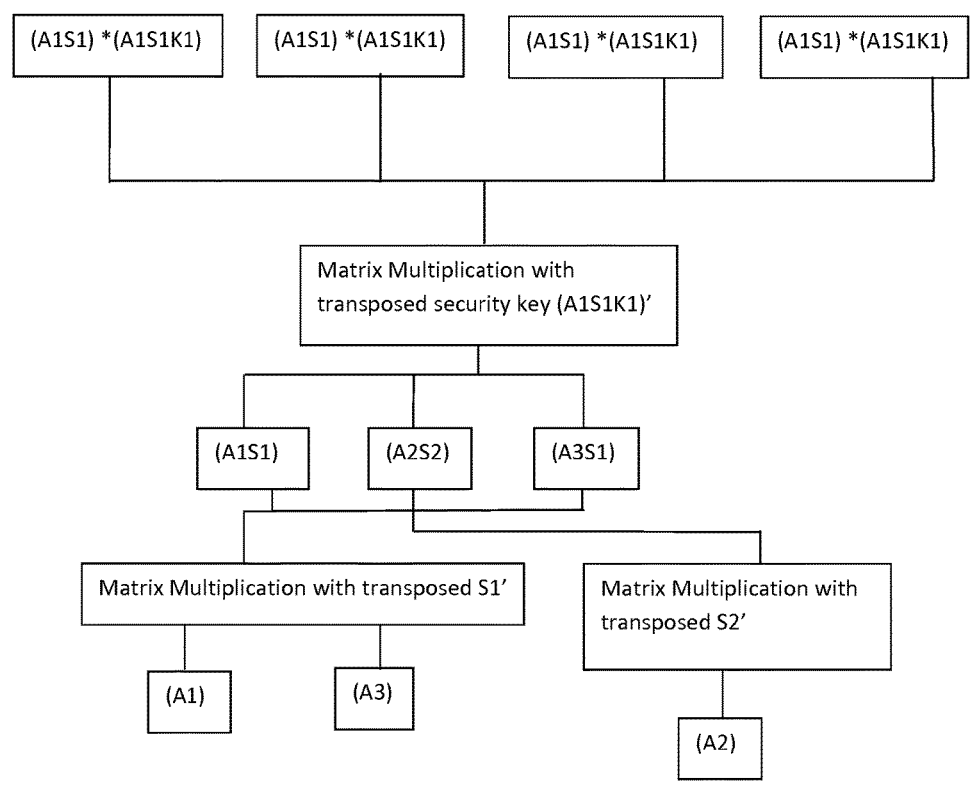
FIG. 6 shows a flow-diagram illustrating an exemplary embodiment for recovering the base-sentence, in accordance with the present disclosure.

Referring to FIG. 6, the exemplary embodiment includes the following steps for recovering the base-sentence:

receiving computational input as security matrix (A1S1K1), security answer matrices (S1, S2);

extracting the matrices [{(A1S1)*(A1S1K1)}, {(A1S2)*(A1S1K1)}, {(A1S3)*(A1S1K1)}] from the repository;

performing matrix-transpose of the security matrix (A1S1K1), the resultant transposed security matrix (A1S1K1)';

performing matrix multiplication of the extracted matrices [{(A1S1)*(A1S1K1)}, {(A1S2)*(A1S1K1)}, {(A1S3)*(A1S1K1)}] with the transposed security matrix (A1S1K1)';

obtaining the matrices (A1S1), (A2S2), (A3S1) as a result of the;

performing matrix-transpose of the security answer matrices (S1, S2), the resultant transposed security answer matrices (S1', S2');

performing matrix multiplication with the transposed security answer matrix (S1') with the matrices (A1S1) and (A3S1), sequentially, performing matrix multiplication with the transposed security answer matrix (S2') with the matrices (A2S2); and obtaining the matrices A1, A2, A3 as the resultant matrices corresponding to the user inputted base-sentence.

TECHNICAL ADVANCEMENTS

The technical advancements of the computer implemented systems and methods for generating and recovering an authorization code as envisaged by the present disclosure include the realization of:

a computer implemented system for a computer implemented system and method for generating an authorization code;

a computer implemented system for a computer implemented system and method for recovering the authorization code;

a system that receives a base-sentence as a user input for the purpose of generating and recovering the authorization code;

a system that is capable of generating an authorization code which adheres to the policies related to creation of authorization codes;

a system that generates an authorization code which is easy to remember for the user;

a system that allows creation of multiple authorization codes for multiple user accounts;

a system that generates highly secure authorization code while maintaining the privacy of the user;

a system that allows easy recovery of the forgotten authorization code;

a system that enables hassle free log-in to the user accounts;

a system that is customizable and has multiple layers of security; and a system that reduces security risk of brute force and dictionary attacks.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

We claim:

1. A computer implemented system for generating an authorization code, said system comprising:
    a memory configured to store a set of computer instructions;
    a processor configured to execute said set of computer instructions to implement the following:
    a user-input module configured to receive a user input as a base-sentence having a plurality of alpha-numeric and special characters;
    a first matrix-generator cooperating with said user-input module, said first matrix generator including a first calculator configured to calculate the total number of characters in the base-sentence entered by the user and determine a nearest prefect square matrix based on the total number of characters calculated, said first matrix-generator configured to generate a first-matrix by populating each characters of the base-sentence into each cell of the first matrix;
    a pattern-generator cooperating with said first matrix-generator, said pattern-generator configured to generate patterns by selecting at least a cell of the first-matrix created by the first matrix-generator;
    a pattern-selector cooperating with said pattern-generator, said pattern-selector configured to enable the user to select a pattern from a group of patterns generated by said pattern-generator; and
    a code generating engine cooperating with said pattern-selector, said code generating engine configured to generate the authorization code based on the base-sentence provided by the user initially, said engine comprises:
        a second matrix-generator including a first extractor configured to extract ASCII values corresponding to each of the characters of the selected pattern, said second matrix-generator configured to generate a second matrix by populating each cell of the second matrix with the ASCII value of each character of the selected pattern, wherein the number of columns of the second matrix is equal to the number of rows of the first matrix;
        a third matrix-generator comprising:
            a second extractor configured to extract at least a coordinate of each of the characters of the selected pattern; and
            a second calculator cooperating with said second extractor, said second calculator configured to calculate the total number of characters in the extracted coordinates of the selected pattern;

said third matrix-generator configured to generate a third matrix by populating each cell of the third matrix with a coordinate value extracted by the second extractor, wherein the third matrix corresponds to a nearest prefect square matrix based on the total number of coordinate characters calculated by said second calculator;

a fourth matrix-generator cooperating with said second matrix-generator and third matrix-generator, said fourth matrix-generator including a matrix-multiplier configured to perform matrix multiplication of the second matrix with the third matrix, said fourth matrix-generator configured to generate a fourth matrix by populating each cell of the fourth matrix with at least a value obtained from matrix multiplication;

a hex-convertor cooperating with said fourth matrix-generator, said hex-convertor configured to convert each of the cell value of the fourth matrix into a hex value;

a hash-convertor cooperating with said hex-convertor, said hash-convertor configured to hash the hex values to obtain the authorization code for the corresponding user; and a base-sentence recovery module comprising:
means for receiving a request from the user for the base-sentence; and
means for extracting the base-sentence in response to the request from the user.

2. The system as claimed in claim 1, wherein said hash-convertor configured to hash the hex values using SHA-256 to obtain the authorization code.

3. The system as claimed in claim 1, wherein said first matrix-generator further comprises a determinator configured to determine if the characters of the base-sentence fits within the nearest perfect square matrix, wherein based on a negative result of the determinator, said first matrix-generator configured to increase the number of columns of the nearest perfect square matrix by one.

4. The system as claimed in claim 1, wherein said pattern-selector comprises a customization module configured to enable the user to customize the characters of the selected pattern, wherein the customization format of the characters is selected from the group consisting of an upper case format, a lower case format and a combination thereof.

5. The system as claimed in claim 1, wherein said system further comprises:
a pin-generator configured to generate at least a four digit PIN, said pin-generator further configured to enable the user to customize the generated PIN; and
a masking module cooperating with said pattern-selector and said pin-generator, said masking module configured to mask the selected pattern with the PIN and generate a masked pattern.

6. The system as claimed in claim 1, wherein said system comprises a repository configured to store user related information such as user credentials provided at the time of registration, user submitted base-sentence, a selected pattern corresponding to a user customized pattern and a masked pattern, a PIN, an authorization code, a user selected secret question and an answer to the user selected secret question.

7. A computer implemented method for generating authorization code, said method comprising:
storing, in a memory, a set of computer instructions;
executing, by a processor, said set of computer instructions;

receiving, by a user-input module, a base-sentence having a plurality of alpha-numeric characters as a user-input;
calculating, by a first calculator, the total number of characters in the base-sentence provided by the user and determining a nearest prefect square matrix based on the total number of characters calculated in the user inputted base-sentence;
generating, by a first matrix-generator, a first matrix by populating each cell of the first matrix with at least one character of the base-sentence;
generating, by a pattern-generator, patterns by selecting at least a cell of the first-matrix;
enabling, by a pattern-selector, the user to select a pattern from a group of generated patterns;
extracting, by a first extractor, ASCII values corresponding to each of the characters of the selected pattern and generating, by a second matrix-generator, a second matrix by populating each cell of the second matrix with ASCII value of each characters of the selected pattern, wherein the number of columns of the second matrix is equal to the number of rows of the first matrix;
extracting, by a second extractor, at least a coordinate of each the characters of the selected pattern and calculating, by a second calculator, the total number of characters in the extracted coordinates of the selected pattern and generating, by a third matrix-generator , a third matrix by populating each cell of the third matrix with a coordinate value from the extracted coordinates of the selected pattern;
matrix-multiplying, by a matrix-multiplier, the second matrix and the third matrix for obtaining a fourth matrix and converting, by a hex-convertor, each of the cell value of the fourth matrix into a hex value;
hashing, by a hash-convertor, the hex values of the fourth matrix for obtaining the authorization code;
receiving, a request from the user for the base-sentence; and
extracting the base-sentence in response to the request from the user.

8. The method as claimed in claim 7, wherein the step of identifying a nearest prefect square matrix based on the total number of characters calculated in the user inputted base-sentence subsequently, includes a step of determining, by a determinator, whether all the characters of the base-sentence can be populated within the nearest perfect square matrix, wherein based on a negative result, increasing the number of columns of the nearest perfect square matrix by one for creating the first matrix.

9. The method as claimed in claim 7, wherein the step of calculating the total number of characters in the extracted coordinates of the selected pattern further includes a step of determining, by the determinator, a nearest prefect square matrix based on the calculated total number of extracted prefect square matrix.

10. The method as claimed in claim 7, wherein the step of enabling the user to select a pattern further includes a step of customizing, by a customization module, the characters of the selected pattern, wherein the customization format of the characters is selected from the group consisting of an upper case format, a lower case format and a combination thereof.

11. The method as claimed in claim 7, wherein said method further comprises:
generating, by a pin-generator, a Personal Identification Number (PIN) corresponding to the user; and
masking, by a masking module, the selected pattern with the PIN.

12. The method as claimed in claim 7, wherein said method includes a step of storing, in a repository, at least a user related information such as user credentials, a user submitted base-sentence, a selected pattern corresponding to a user customized pattern and a masked pattern, a PIN, an authorization code, a user selected secret question and an answer to the user selected secret question.

13. A computer implemented system for recovering an authorization code, said system comprising:
- a processor configured to execute a set of instructions, stored in a memory, to implement the following:
  - a repository for storing a user input base-sentence, the repository configured to store at least a user related information such as user credentials provided at the time of registration, a user submitted base-sentence having a plurality of alpha numeric characters, a selected pattern corresponding to a user customized pattern and a masked pattern, a Personal Identification Number (PIN), an authorization code, a user selected secret question and an answer to the user selected secret question;
  - a first matrix-generator cooperating with said repository, said first matrix-generator including a first extractor configured to retrieve characters of the base-sentence, said first extractor further configured to extract ASCII values of each of the characters of the base-sentence, said first matrix-generator configured to generate a first set of matrices to accommodate all the characters of the base-sentence in the first set of matrices, wherein the characters of the base-sentence represented by its corresponding ASCII value in the first set of matrices;
  - a second matrix-generator cooperating with said repository, said second matrix-generator including a second extractor configured to retrieve characters of the answer of the user selected question, said second extractor further configured to extract ASCII values of each of the characters of the answer, said second matrix-generator configured to generate a second set of matrices to accommodate all the characters of the answer in the second set of matrices, wherein the characters of the answer represented by its corresponding ASCII value in the second set of matrices;
  - a first matrix-multiplier cooperating with said first matrix-generator and said second matrix-generator, said first matrix-multiplier configured to multiply each matrix corresponding to the first set matrices with each matrix corresponding to the second set of matrices, said first matrix-multiplier further configured to generate and store a third set of matrices based on the matrix multiplication into said repository;
  - a fourth matrix-generator cooperating with said first matrix-generator and said second matrix-generator, said fourth matrix-generator configured to generate a key-matrix by performing matrix multiplication of a matrix selected from the first set of matrices, a matrix selected from the second set of matrices and a key; and
  - a second matrix-multiplier cooperating with said first matrix-multiplier, said fourth matrix-generator and said repository, said second matrix-multiplier configured to multiply each matrix corresponding to the third set of matrices with the key-matrix and generate a fourth set of matrices, said second matrix-multiplier configured to store the fourth set of matrices into said repository;
  - a module for recovering the user input base-sentence stored from said repository, comprising:
    - means for receiving a request from the user for the base-sentence; and
    - a third extractor cooperating with said repository, said third extractor configured to extract the fourth set of matrices, the second set of matrices and the key-matrix in response to receiving the request from the user for the base-sentence;
    - a transpose module cooperating with said third extractor, said transpose module configure to transpose the key-matrix and the second set of matrices; and
    - a third matrix-multiplier cooperating with said third extractor and said transpose module, said third matrix-multiplier configured to perform a first matrix multiplication of each matrix corresponding to the fourth set matrices with the transposed key-matrix, based on the matrices obtained as a result of the first matrix multiplication said third matrix-multiplier further configured to perform a second matrix multiplication of each resultant matrices with the transposed second set of matrices to recover the base-sentence.

14. The system as claimed in claim 13, wherein said fourth matrix-generator comprises:
- a matrix-selector configured to enable the user to select a matrix from the first set of matrices and the second set of matrices to generate the key-matrix; and
- a key-inputter configured to enable the user to provide the key selected from the group consisting of an IP (internet protocol) address of a computing device accessed by the user, a MAC (media access control) address of the computing device accessed by the user, an email ID of the registered user, an IMEI (international mobile station equipment identity) number of the user's computing device.

15. The system as claimed in claim 13, wherein said third matrix-multiplier further configured to retrieve the third set of matrices on completion of the first matrix multiplication.

16. The system as claimed in claim 13, wherein said third matrix-multiplier further configured to retrieve the first set of matrices on completion of the second matrix multiplication, wherein the first set of matrices represents the ASCII values of the characters of the base-sentence stored into said repository.

17. A computer implemented method for implementing a system for recovering an authorization code, said method comprising:
- computing a set of instructions stored in a memory by a processor for storing a user input base-sentence into a repository:
  - storing in a repository, at least a user related information such as user credentials provided at the time of registration, a user submitted base-sentence having a plurality of alpha numeric characters, a selected pattern corresponding to a user customized pattern and a masked pattern, a Personal Identification Number (PIN), an authorization code, a user selected secret question and an answer to the user selected secret question;
  - extracting, by a first extractor, characters of the base-sentence and corresponding ASCII values of each of the characters of the base-sentence;
  - generating, by a first matrix-generator, a first set of matrices to accommodate all the characters of the base-sentence in a cell of a matrix, wherein the characters of the base-sentence represented by its corresponding ASCII value in the first set of matrices;

extracting, by a second extractor, characters of the answer of the user selected question and corresponding ASCII values of each of the characters of the answer;

generating, by a second matrix-generator, a second set of matrices to accommodate all the characters of the answer in a cell of a matrix, wherein the characters of the answer represented by its corresponding ASCII value in the second set of matrices;

performing, by a first matrix-multiplier, matrix multiplication, each matrix corresponding to the first set matrices with each matrix corresponding to the second set of matrices, further generating and storing, by the first matrix-multiplier, a third set of matrices based on the matrix multiplication into said repository;

generating, by a fourth matrix-generator, a key-matrix by matrix multiplying a matrix selected from the first set of matrices, a matrix selected from the second set of matrices and a key; and performing matrix multiplication, by a second matrix-multiplier, each matrix corresponding to the third set of matrices with the key-matrix, further generating and storing, by the second matrix-multiplier, a fourth set of matrices into said repository;

computing a set of instructions stored in said memory by said processor for recovering the user input base-sentence stored into said repository:

receiving a request from the user for the base-sentence;

in response to receiving the request from the user for the base-sentence:

extracting, by a third extractor, from said repository, the fourth set of matrices, the second set of matrices and the key-matrix;

performing, by a transpose module, matrix transpose of the key-matrix and the second set of matrices; and performing, by a third matrix-multiplier, matrix multiplication, each matrix corresponding to the fourth set matrices with the transposed key-matrix, based on the matrices obtained as a result of the matrix multiplication further performing matrix multiplication, each resultant matrices with the transposed second set of matrices to recover the base-sentence.

* * * * *